United States Patent [19]

Newkirk et al.

[11] Patent Number: 4,777,014
[45] Date of Patent: Oct. 11, 1988

[54] PROCESS FOR PREPARING SELF-SUPPORTING BODIES AND PRODUCTS MADE THEREBY

[75] Inventors: Marc S. Newkirk; Michael K. Aghajanian, both of Newark; Danny R. White, Newcastle, all of Del.

[73] Assignee: Lanxide Technology Company, LP, Newark, Del.

[21] Appl. No.: 837,448

[22] Filed: Mar. 7, 1986

[51] Int. Cl.$^4$ .............................................. B22F 1/00
[52] U.S. Cl. .......................................... 419/12; 419/2; 419/19; 419/23; 419/57; 75/244; 501/96; 501/98; 264/125; 264/132
[58] Field of Search ................... 419/12, 2, 19, 23, 57; 75/244; 501/96, 98; 264/125, 332

[56] References Cited

U.S. PATENT DOCUMENTS

| | | | |
|---|---|---|---|
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |

Primary Examiner—Stephen J. Lechert, Jr.

[57] ABSTRACT

Self-supporting bodies are produced by reactive infiltration of a parent metal with a boron source typically resulting in a composite comprising a parent metal boride and metal. The mass to be infiltrated may contain one or more inert fillers admixed with the boron source to produce a composite by reactive infiltration, which composite comprises a matrix of metal and parent metal boride embedding the filler. The relative amounts of reactants and process conditions may be altered or controlled to yield a body containing varying volume percents of ceramic, metal and/or porosity.

20 Claims, 5 Drawing Sheets

PROCESS FOR PREPARING SELF-SUPPORTING BODIES AND PRODUCTS MADE THEREBY

FIELD OF THE INVENTION

This invention relates generally to a novel class of self-supporting bodies, and to novel methods for their preparation. In its more specific aspects, this invention relates to a method of producing self-supporting bodies by the reactive infiltration of a molten parent metal into a bed or mass containing a boron source and, optionally, one or more inert fillers, to form a composite comprising metal and boride, and filler if used.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot-pressing, reaction sintering and reaction hot pressing is well known. In the case of hot pressing, fine powder particles of the desired boride are compacted at high temperatures and pressures. Reaction hot pressing involves, for example, compacting boron or a metal boride with a suitable metal-containing powder, also at elevated temperatures and pressures. U.S. Pat. No. 3,937,619 to E. Clougherty describes the preparation of a boride body by hot-pressing a mixture of powdered metal with a powdered diboride, and U.S. Pat. No. 4,512,946 to M. Brun describes hot-pressing ceramic powder with boron and a metal hydride to form a boride composite. However, these hot pressing methods require special handling and expensive special equipment, they are limited as to the size and shape of the ceramic part produced, and they typically involve low process productivities and high manufacturing costs.

A second major limitation on the use of ceramics for structural applications is their general lack of ductility and toughness (i.e., damage tolerance or resistance to fracture). This characteristic tends to result in sudden, catastrophic failure of ceramics in applications involving even rather moderate tensile stresses.

One approach to overcome this problem has been to attempt to use ceramics in combination with metals, for example, as cermets or metal matrix composites. The objective of this approach is to obtain a combination of the best properties of the ceramic (e.g. hardness) and the metal (e.g. ductility). A method for producing a ceramic-metal composite (cermet) is disclosed in European Application No. 0 116 809. According to this disclosure, there is first provided a bulk reaction mixture of particulate reactants, and this mixture is then reacted upon contact with molten metal which infiltrates the mixture. Exemplary of such a reaction mixture is one containing titanium dioxide, boron oxide, and aluminum (in stoichiometric amounts and in particulate form), which upon contact with molten aluminum, reacts to form titanium diboride and alumina as the ceramic phase that is infiltrated by the aluminum. It is clear from the disclosure that the molten metal, i.e. aluminum, is a reducing agent and not a precursor to a boride forming reaction.

European Application No. 0 113 249 discloses a method for making a cermet by first forming dispersed particles of a ceramic phase in situ in a molten metal phase, and then maintaining this molten condition for a time sufficient to effect formation of an intergrown ceramic network. Formation of the ceramic phase is illustrated by reacting a titanium salt with a boron salt in a molten metal. The ceramic is developed in situ and becomes an intergrown network. There is, however, no infiltration; and further the molten metal employed in the process, e.g. aluminum, is a reducing agent and does not react to form a boride, and the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride.

U.S. Pat. No. 3,864,154 discloses a ceramic-metal system by infiltration. A compact of $AlB_{12}$ was impregnated with molten aluminum under vacuum to yield a system of these components. Other materials prepared included $SiB_6$-Al; B-Al; $B_4$C-Al/Si; and $AlB_{12}$-B.Al. There is no suggestion whatsoever of a reaction, and no suggestion of making composites involving a reaction with the infiltrating metal nor of any reaction product embedding an inert filler or being part of a composite.

While these concepts for producing cermet materials have in some cases produced promising results, there is a general need for more effective and economical methods to prepare such ceramic-metal composites.

SUMMARY OF THE INVENTION

In accordance with the present invention, self-supporting bodies are produced utilizing a parent metal infiltration and reaction process (i.e. reactive infiltration) in the presence of a boron source (defined below). This bed or mass of material to be infiltrated by parent metal may be entirely comprised of a boron source, typically resulting in a composite comprising a parent metal boride and a metal. Alternatively, the mass to be infiltrated may contain one or more inert fillers admixed with the boron source to produce a composite by reactive infiltration, which composite comprises a matrix of metal and parent metal boride embedding the filler. The reactant concentrations and process conditions may be altered or controlled to yield a body containing varying volume percents of ceramic, metal and/or porosity.

Broadly, in the method of this invention, a mass comprising a boron source is placed adjacent to or contacted with a body of molten metal or metal alloy, which is melted in a substantially inert environment within a particular temperature envelope. The boron source may be elemental boron and/or a suitable metal boride which is reducible by the molten parent metal under the temperature conditions of the process. The molten metal infiltrates the mass and reacts with the boron source forming a parent metal boride as a reaction product. At least a portion of the reaction product is maintained in contact with the metal, and molten metal is drawn or transported toward the unreacted boron source by a wicking or capillary action. This transported metal forms additional parent metal boride, and the formation or development of a ceramic-metal composite is continued until the parent metal or boron source has been consumed, or until the reaction temperature is altered to be outside the reaction temperature envelope. The resulting structure includes parent metal boride, metal and/or intermetallics or voids or a combination thereof, and these several phases may or may not be interconnected in one or more dimensions. The final volume fractions of boride and metallic phases, and the degree of interconnectivity, can be controlled by changing the conditions, such as the initial density of the boron source, relative amounts of boron source and parent metal, alloying the parent metal, dilution of the boron source with a filler, temperature and time. Typically the mass of boron source will be at least somewhat porous so as to allow for wicking of the parent metal through the reaction product. Wicking occurs apparently either because any volume change on reaction does not fully close off pores through which parent metal can continue to wick or because the reaction product remains permeable to the molten metal due to such factors as surface energy considerations which render at least some of its grain boundaries permeable to the parent metal.

In another embodiment, a composite is produced by the transport of molten parent metal into one or more inert filler materials containing a boron source. In this embodiment, a boron source is incorporated into a suitable filler material, which then is placed adjacent to or in contact with the molten parent metal. This set-up may be supported on or in a separate bed that is non-wettable by and non-reactive with the molten metal under the process conditions. The molten parent metal infiltrates the boron source-filler mixture and reacts with the boron source to form a parent metal boride. The resulting self-supporting ceramic-metal composite typically is a dense microstructure composed of a filler embedded by a matrix comprising parent metal boride and metal. Only a small amount of boron source is required to promote the reactive infiltration process. Thus, the resulting matrix can vary in content from one composed primarily of metallic constituents thereby exhibiting certain properties characteristic of metal; to cases where a high concentration of the boron source is used in the process, thereby producing a significant boride phase which can dominate the properties of the matrix. The filler may serve to enhance the properties of the composite, lower the raw materials cost of the composite, or moderate the kinetics of the boride formation reaction and the associated rate of heat evolution.

In a further embodiment, the material to be infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations.

Definitions

As used in this specification and the appended claims, the terms below are defined as follows:

"Parent metal" refers to that metal, e.g. aluminum, which is the precursor for the polycrystalline reaction product, that is, the parent metal boride, and includes that metal as a pure or relatively pure metal, a commercially available metal having impurities and/or alloying constituents therein, and an alloy in which that metal precursor is the major constituent, and when a specific metal is mentioned as the parent metal, e.g. aluminum, the metal identified should be read with this definition in mind unless indicated otherwise by the context.

"Boron source" refers to elemental boron or a metal boride which will react with the parent metal under the process temperature conditions to yield a boride of the parent metal, and is usually a solid at process conditions but, especially for high melting point parent metals, may be a liquid at process conditions.

"Parent metal boride" means the reaction product of the boron source and the parent metal and includes a binary compound of boron with the parent metal as well as ternary or higher order compounds which may also include a constituent of the boron source.

This invention will now be described by reference to the Drawings.

DETAILED DESCRIPTION OF THE INVENTION AND PREFERRED EMBODIMENTS

In accordance with the invention, a self-supporting body is produced by the reactive infiltration of a molten parent metal with a boron source to form a polycrystalline ceramic-metal composite comprising the reaction product of said parent metal with the boron source and one or more unoxidized constituents of the parent metal. If the boron source contains a metal boride reducible by the parent metal under the reaction conditions, the composite then may include, in the metallic phase, reduced metal constituents of the boron source. Also, the composite may exhibit porosity or voids. The boron source, typically a solid at the process conditions, is preferably in fine particulate or powdered form, but it will be appreciated that parent metals which melt at high temperatures may require the use of compatible boron sources which liquify at process temperature ranges. Where desired, the mass of boron source may be substantially impermeable, but the molar volume of the product formed is less than that of the boron source so as to allow for the migration of molten metal through the product and in to contact with the boron source. The environment or atmosphere for the process is chosen to be relatively inert or nonreactive under the process conditions. Argon or vacuum, for example, would be suitable process atmospheres.

Typical of the method in which boron is used in elemental form is the reaction of powdered boron with a parent metal, such as aluminum, to form a composite comprising a parent metal boride and parent metal, e.g. aluminum boride and aluminum, and possibly other unreacted constituents of the parent metal. Alternatively, the parent metal may be reacted with a reducible metal boride serving as the boron source to form a ceramic-metal composite body of the parent metal boride, nonreacted constituents of the parent metal, and reduced constituents of the initially employed metal boride, including intermetallics formed by the reaction of the parent metal with metallic constituents liberated by reduction of the initially employed metal boride. For example, if titanium is used as the parent metal and aluminum boride as the boron source, the metal phase may include titanium (and any unreacted alloying constituents of the titanium), aluminum, and one or more aluminum/titanium intermetallics (but normally not all of these simultaneously). Titanium boride is also formed in the process.

Although the present invention is hereinafter described with particular reference to embodiments in which the parent metal is aluminum and the boron source is elemental boron, this is for illustrative purposes only. Other parent metals also may be used such as silicon, titanium, zirconium, hafnium, lanthanum, iron, calcium, vanadium, niobium, magnesium and beryllium, and examples for several such parent metals are given below. Also any reducible metal boride may be used which satisfies the criteria of the invention.

Figure 1:
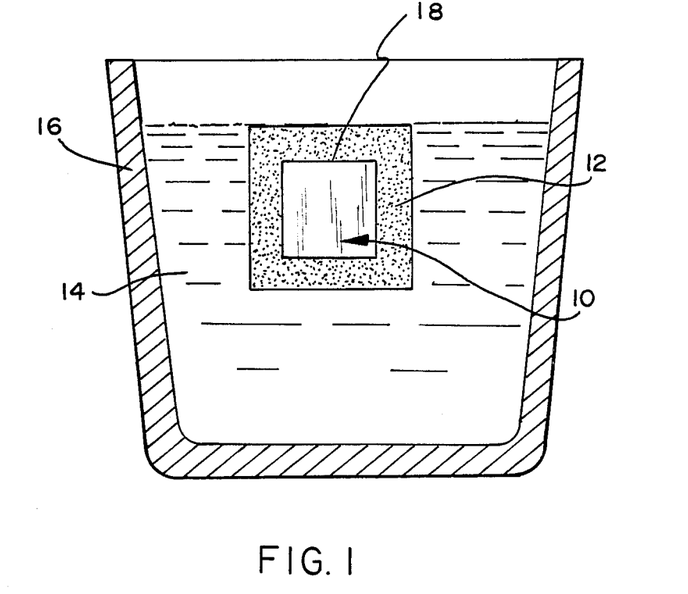
FIG. 1 is a schematic elevational view in cross-section showing an aluminum ingot embedded in boron powder within a refractory crucible, to be processed in accordance with the invention.

Referring to FIG. 1, the parent metal precursor, e.g. aluminum, indicated generally at 10 is formed into an ingot, billet, rod, plate, or the like. The metal is at least partially embedded in elemental boron 12, preferably having a particle size of from about 0.1 $\mu$m to 100 $\mu$m. This set-up or assembly is surrounded by an inert material 14, typically in particulate form, which is non-wettable by and non-reactive with the molten metal, and contained within a crucible 16 or other refractory vessel. The top surface 18 of the parent metal may be exposed, or the parent metal may be completely embedded or surrounded by the boron source, and also the inert bed 14 may be omitted. This assembly is placed in a furnace and heated, preferably in an inert atmosphere such as argon, above the melting point of the parent metal but preferably below the melting point of the desired parent metal boride so as to form a body or pool of molten metal. It should be understood that the operable temperature range or preferred temperature may not extend over this entire interval. The temperature range will depend largely upon such factors as the composition of the parent metal and the choice of boron source. Molten metal contacts the boron source, and a parent metal boride is formed as the reaction product. Upon continued exposure to the boron source, the remaining molten metal is progressively drawn through the reaction product in the direction of and into the mass containing the boron source, to provide continued formation of reaction product at the interface between the molten metal and boron source. The ceramic-metal composite produced by this method comprises the reaction product of the parent metal with the boron source (i.e. boron and/or one or more reducible metal borides) and one or more non-oxidized constituents of the parent metal or voids or both, or liberated metal or an intermetallic resulting from the use of a reducible metal boride as the boron source. A substantial amount of the boron source is reacted to form the parent metal boride, preferably this amount being at least about 50% and most preferably at least about 90%. The conversion to the parent metal boride could be significant in some high temperature applications for the product, because the boride is more stable than boron in that boron will tend to react with metal, e.g. aluminum, present in the product. The boride crystallites formed by the process may or may not be interconnected, and the metal phases and any voids in the product are normally at least partially interconnected. Any porosity tends to result from a partial or nearly complete depletion of the parent metal phase in favor of the formation of additional reaction product (as in the case where stoichiometric reactants or excess boron is present), but the volume percent of voids also will depnnd on such factors as temperature, time, type of parent metal, choice of boron source, and the porosity of the bed of boron source.

In another aspect of the invention, there is provided a self-supporting ceramic-metal composite comprising a matrix of metallic constituents and a parent metal boride embedding a substantially inert filler. The matrix is formed by infiltrating a parent metal into a bed or mass of the filler intimately mixed with a boron source. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. The volume of filler material may be a loose or bonded array or arrangement, which array has interstices, openings, intervening spaces, or the like, to render the filler material permeable to the infiltration of molten parent metal. Further, the filler material may be homogeneous or heterogeneous. If desired, these materials may be bonded with any suitable binding agent which does not interfere with the reactions of this invention or leave any undesirable residual by-products within the final composite product. A filler which would tend to react excessively with the boron source or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

A suitable refractory container holding the parent metal and a bed or volume of filler with an admixed boron source properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron source, thereby producing the desired ceramic-metal composite.

It has been discovered that infiltration of the permeable filler by the parent metal is promoted by the presence of a boron source in the filler. A small amount of boron has been shown to be effective, but the minimum can depend upon a number of factors such as type and particle size of the boron source, type of parent metal, type of filler, and process conditions. Thus, a wide variation of boron source concentrations can be provided in the filler, but the lower the concentration of boron source, the higher the volume percent of metal in the matrix. When very low amounts of the boron source are used, e.g. one or ten weight percent based on the total weight of filler plus boron source, the resulting matrix is interconnected metal and a minor amount of parent metal boride dispersed in the metal. In a control test with no boron source present, there was no formation of a composite. Example 9 below shows the results for five runs using an alumina filler with 0, 1, 2, 5 and 10 weight percent boron and aluminum parent metal. In the absence of a boron source, reactive infiltration of the filler did not occur, and infiltration may not be possible without special procedures, such as the application of external pressure to force the metal into the filler.

Because a wide range of boron source concentrations in the filler can be used in the process of this invention, it is possible to control or to modify the properties of the completed metal-ceramic composite by varying the concentration of boron source. When only a small amount of boron source is present relative to the amount of parent metal, such that the mass comprises a low density of boron source, the composite body or matrix properties are dominated by the properties of the parent metal, most typically ductility and toughness, because the matrix is predominantly metal. When a large amount of boron source is used, as for example when elemental boron particles are densely packed around the filler material or occupy a high percentage of space between constituents of the filler, the composite body or matrix properties tend to be dominated by the parent metal boride, in that the body or matrix would be harder or less ductile or less tough. Selection among these extreme characteristics may be highly desirable to meet the needs of different potential applications for these ceramic-metal composites.

Additional variations in the characteristics and properties of the composite can be created by controlling the infiltration conditions. Variables which can be manipulated include the nature and size of the parrticles of boron source material, the temperature and time of infiltration, and the amount of parent metal in relation to the amount of boron available from the boron source and the stoichiometry of the parent metal boride to be formed. For example, reactive infiltration involving large boron source particles and minimum exposur times at low temperatures will result in a partial conversion of the boron source to parent metal boride. As a consequence, unreacted boron source material remains in the microstructure, which may impart desirable properties to the finished material for some purposes. Infiltration involving fine boron source particles, high temperatures and prolonged exposure times (perhaps even a hold at temperature after infiltration is complete) will tend to favor substantially complete conversion to the parent metal boride. Preferably conversion of the boron source to parent metal boride is at least about 50%, and most preferably at least about 90%. Infiltration at high temperatures (or a subsequent high temperature treatment) also may result in densification of some of the composite constituents by a sintering process. In addition, as noted previously, the reduction of the amount of available parent metal below that necessary to form the parent metal boride and fill the resulting interstices in the material may result in a porous body which also could have useful applications. In such a composite, porosity may vary from about 1 to 25 volume percent, and sometimes higher, depending upon the several factors or conditions enumerated above.

A particularly effective method for practicing this invention involves forming the boron source, together with any desired inert filler materials, into a preform with a shape corresponding to the desired geometry of the final composite part. The preform may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the boron source and filler, if present. Initial binding of the particles or fibers prior to reactive infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of molten metal, preferably having a porosity of between about 5 and 90% by volume and more preferably between about 25 and 50% by volume. In the case of an aluminum parent metal, silicon carbide, alumina and aluminum dodecaboride are suitable preform filler materials (among others), and as particulates typically have a mesh size of from about 14 to 1000, but an admixture of filler materials and mesh sizes may be used. The preform is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

The following examples illustrate the novel reaction products of this invention and the method by which they are prepared; however, these examples are illustrative only and they are not intended to limit the invention claimed.

EXAMPLE 1

An aluminum bar of 99.7% purity, measuring approximately 2 by ⅜ by ¼ inches was submerged in 60 mesh crystalline boron powder in a refractory crucible. This system was placed in a resistance, heated tube furnace supplied with argon gas flowing at 200 cc/minute, heated to setpoint temperature over about a five hour period, maintained at a 1200° C. setpoint temperature for 22 hours, and allowed to cool for about five hours prior to removal from the furnace.

Examination of the product as-grown and after sectioning showed that reaction of the parent aluminum metal had occurred outwardly in all directions from the original surface of the metal bar, leaving behind a hole nearly identical to the shape of the original bar. Microscopic examination of the reaction product confirmed a ceramic-metal composite and showed both the ceramic and metal constituents to be interconnected. X-ray diffraction analysis of the product confirmed the presence of aluminum dodecaboride ($AlB_{12}$) and aluminum. There also was a trace amount of aluminum nitride, which might have resulted from minor contamination of the argon atmosphere or of the boron powder.

Figure 2:
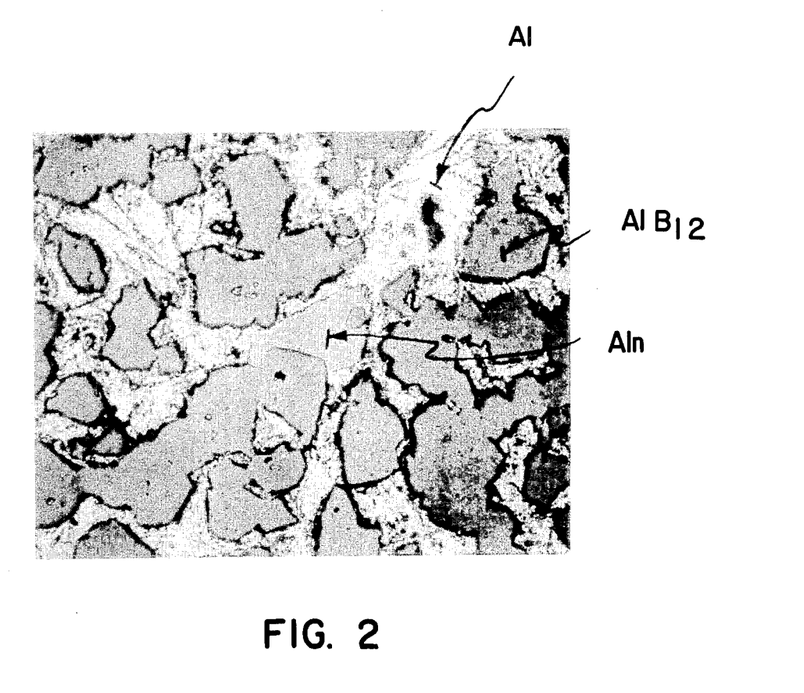
FIG. 2 is a photomicrograph of a section of an aluminum boride-metal composite (magnified 400 times) obtained from an aluminum alloy containing 3% magnesium and 10% silicon processed with boron at a setpoint temperature of 1200° C. according to Example 1.

FIG. 2 is a photomicrograph at 400× magnification of a cross-section of the composite product showing AlB$_{12}$ (dark gray), Al (light gray) as major phases, and an isolated particle of the AlN contaminant.

The foregoing procedure was repeated except that a bar of aluminum alloy containing 10% silicon and 3% magnesium, and another bar of commercially available A380.1 aluminum alloy were employed as parent metals in separate layups. For each run, a ceramic-metal composite comprising AlB$_{12}$ and Al was formed. Hence, forming a ceramic-metal composite by the method of this invention is not particularly sensitive to the initial composition of the parent metal.

EXAMPLE 2

A cylindrical rod of 99.7% pure titanium, ½ inch in diameter and 1 inch long, was embedded in 92–95% pure amorphous boron powder of 2–3 micron average particle size such that a circular face was exposed to the atmosphere. This set-up, contained in a refractory alumina crucible, was heated to approximately 1700° C. (as measured on the exposed metal surface by an optical pyrometer) in an induction furnace using direct coupling to the metal. The heating was conducted in an atmosphere of 99.5% argon and 0.5% hydrogen gas (hydrogen was added to suppress the partial pressure of trace oxygen contaminants) flowing at 150 cc/min. Heating to temperature was accomplished gradually over approximately 10–20 min. Upon reaching the melting point of titanium, the reaction proceeded very rapidly with considerable evolution of heat. The reaction was complete within about 20 seconds of initiation.

Examination of the resulting material showed that reaction occurred outwardly from the surfaces of the metal into the boron bed, leaving a hole in the location originally occupied by the parent metal. X-ray powder diffraction analysis confirmed the presence of TiB$_2$ and trace amounts of Ti$_3$B$_4$ in the coherent, highly porous body which formed. Neither X-ray diffraction nor optical microscopy revealed the presence of metallic titanium, indicating that in this case there was sufficient boron present such that the reaction had completely consumed the original source of metal.

The foregoing procedure was repeated except that TiB$_2$ powder was employed in combination with the boron powder in a 50 volume percent mixture to moderate the reaction. Upon reaching the melting point of titanium, it was observed that the reaction proceeded at a slower rate (lasting approximately one minute) with less evident heat generation. The resulting coherent, porous material was also found to contain TiB$_2$ with trace amounts of Ti$_3$B$_4$. Presumably, the observed TiB$_2$ represented both the original admixed paricles and a titanium-boron reaction product.

This example illustrates that by a proper choice of materials and conditions, a body can be formed evidencing little or no metal.

EXAMPLE 3

In this example, 98.4% pure silicon chips of various sizes were embedded with an exposed surface in 92–95% pure amorphous boron powder in a refractory crucible. This lay-up was heated in an induction furnace to approximately 1500° C. following the procedure of example 2. The heating was conducted in an atmosphere of 99.0% argon and 1.0% hydrogen gas, flowing at 400 cc/min.

Upon reaching the melting point of silicon, a rapid exothermic reaction occurred leading to the formation of a composite body with a central hole in the location of the original silicon. X-ray powder diffraction analysis of the reaction products confirmed the presence of SiB$_6$ (in two polymorphs) and a Si matrix. Inspection of the product revealed a coherent, hard body with some porosity evident.

EXAMPLE 4

The procedure of Example 2 was repeated except that a rod of 99.7% pure zirconium was used in place of the titanium and heating was conducted to a temperature of approximately 1900° C. in an atmosphere containing 99% argon and 1% hydrogen. Similarly, a rapid exothermic reaction was observed on reaching the melting point of zirconium, resulting in a hollow, highly porous body containing ZrB$_2$ and trace amounts of Zr as determined by X-ray powder diffraction analysis.

Figure 3:
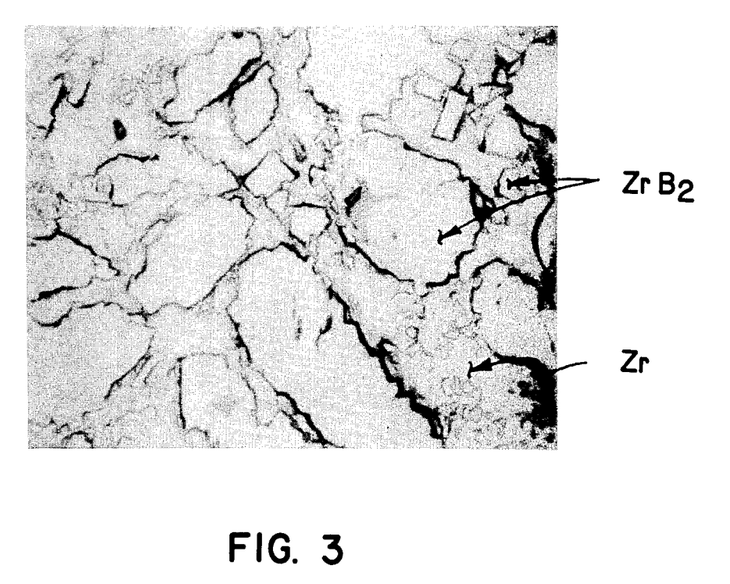
FIG. 3 is a photomicrograph at 400× magnification of a section of a $ZrB_2/Zr$ product formed by the method of Example 4.

To moderate the reaction, the above procedure was repeated using a bed comprised of ZrB$_2$ powder (−100, +200 mesh particle size) and boron particles in a 50 volume percent admixture. The reaction was observed to proceed more slowly, and the resulting hollow body contained ZrB$_2$ particles (including both particles added initially to the bed and particles derived from the zirconium-boron reaction) in a Zr matrix. The microstructure of this material is illustrated in FIG. 3, and the identification of phases was confirmed by X-ray powder diffraction.

EXAMPLE 5

The procedure of Example 2 was repeated using a titanium rod in a bed containing an admixture of 83.6 weight percent titanium nitride powder (−325 mesh particle size) and 16.4 weight percent crystalline boron. This system was heated gradually to approximately 1800°–2000° C. in 99% argon and 1% hydrogen flowing at 200 cc/min.

Above the melting point of titanium, reaction occurred with the boron particles, and the reaction product grew into the bedding to surround the titanium nitride particles. X-ray powder diffraction analysis of the product revealed the presence of TiB$_2$, TiN, and TiB as major phases, a trace amount of Ti$_2$N, and some contamination by Ti$_2$O apparently from reaction with the alumina crucible.

EXAMPLE 6

A cylindrical ingot of titanium (¾ inch long by ⅜ inch diameter) was submerged in a bed of aluminum dodecaboride particles (3–8 μm particle size). This system was heated following the procedure of Example 2 to a reaction temperature of 1800°–2000° C. in an inert atmosphere of 99% argon and 1% hydrogen flowing at 300 cc/min.

Above the melting point of the titanium, reaction occurred with the aluminum dodecaboride thereby forming a composite material as the reaction product grew, comprising a titanium diboride matrix embedding inclusions of aluminum metal liberated by the reaction of the titanium parent metal with the aluminum dodecaboride. Phase identification was confirmed by X-ray powder diffraction analysis of the sample which also showed the presence of trace amounts of Ti$_3$B$_4$ and TiB.

EXAMPLE 7

To demonstrate the use of a preform to obtain a ceramic-metal composite part with a defined final geometry, two preforms were prepared by mixing boron particles with 5% by weight of an organic binder material (Avicel PH-105, a product of FMC Corp.) and pressing into preform disks (1¼ inch diameter by ⅜ inch thick) using a pressure of 40,000 psi. Amorphous boron powder of two different particle sizes was used: (a) 2-3 micron average particle size and (b) −325 mesh particle size. The parent metal was provided by disks (1" diameter by ⅜" thick) of 99.7% pure aluminum. Each assembly comprised one boron preform disk placed beneath an aluminum disk and surrounded on all but the top surface with a bed of 24 mesh size alumina particles (Norton Company 38 Alundum) contained in a refractory crucible. These assemblies were heated in a muffle furnace for 15 hours to setpoint temperature, maintained at 1100° C. for 48 hours and cooled for 10 hours, in pure argon flowing at 200 cc/min.

After exposure, examination of the specimens showed that the aluminum parent metal had infiltrated the preform disks and reacted with the boron to form a ceramic-metal composite comprising $AlB_{12}$ (in two isomorphs) and Al, and trace amounts of an AlN contaminant, as confirmed by X-ray diffraction. The composite disks maintained the geometry of the original preforms, and the dimensions of the final bodies closely approximated the initial dimensions of the preforms. In each case, some excess metal remained on the side in contact with the parent aluminum metal, which was separable from the ceramic-metal composite by a relatively minor force.

Specimens of the ceramic-metal composites were prepared for mechanical measurements by sawing and grinding small test bars for bend testing. The results showed maximum flexural strengths of 28,000 psi and 17,500 psi for the disks made from 2-3 μm and −325 mesh amorphous boron particles, respectively. Both specimens showed evidence of considerable deformation prior to failure, reflecting the ductility of the aluminum constituent in the composite.

EXAMPLE 8

As a further demonstration of the preform method, $TiB_2$ particles (−100/+270 mesh) were blended with amorphous boron particles (−325 mesh) in the proportions 62.5%/37.5% by weight, respectively. Using the procedure of Example 7, these powders were pressed into a 4×4×½ inch preform using a pressure of 3000 psi. The preform was assembled with the parent aluminum (alloy 1100, nominally 99% pure) in the form of a 2×4×½ inch bar placed below the preform in an alumina bed. Heating was accomplished as in Example 7 for a period of 15 hours.

The resulting composite body reproduced closely the shape and dimensions of the preform. The composite was found by X-ray diffraction to contain $TiB_2$ and aluminum. Examination by both optical and scanning electron microscopy indicated the presence of additional phases, identified as residual amorphous boron (not detectable by X-ray diffraction) and $AlB_{12}$. The shorter heating time of this Example as compared to Example 7 may explain the lower degree of completion of the aluminum-boron reaction in the present case.

Flexural strength tests on four samples cut from the composite using the procedure described in Example 7 gave an average value of 21,200 psi (±1000 psi) and even greater evidence of ductility than the materials of the preceding example. The highly deformable character of this material presumably results from its higher aluminum content, a consequence of the lower compaction pressure and therefore lower density of the initial preform in the present case.

EXAMPLE 9

To illustrate the effectiveness of only a small concentration of boron, preform disks were prepared with alumina filler particles plus 0, 1, 2, 5 and 10 percent by weight amorphous boron. In preparing the disks, the appropriate compositional percentages of alumina (38 Alundum, 220 mesh size) and amorphous boron (2-3 μm particle size) were mixed with 5% by weight of an organic binder (Avicel PH-105) and pressed into disks 1¼ inches in diameter by 5/16 inch thick. These disks were buried in refractory beds of alumina particles (38 Alundum, 90 mesh size) with a cylindrical ingot of 99.7% pure aluminum, ½ inch thick by 1 inch diameter, placed on top of each disk such that the circular faces were in contact. The above described systems were heated to a 1200° C. setpoint temperature for 17 hours in pure argon flowing at 200 cc/min.

In each system where the filler disk contained boron, molten aluminum infiltrated the filler disk, thereby embedding the alumina particles to form a composite material having essentially an aluminum metal matrix containing some reaction product particles. In the system which contained no boron in the filler disk, there was no infiltration of the filler by the molten aluminum body. The infiltrated composites accurately maintained the geometry and dimensions of the preform.

Figure 4:
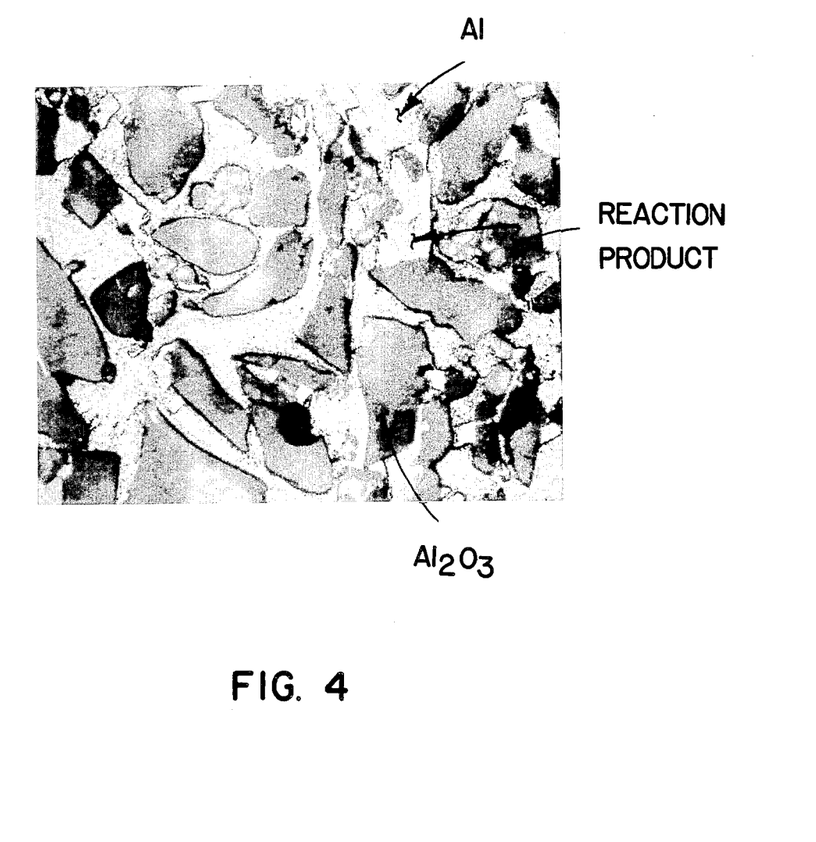
FIG. 4 is a photomicrograph at 400× magnification of a section of an $Al_2O_3/Al$ composite formed by reactive infiltration of aluminum into a preform of $Al_2O_3$ plus 1% by weight boron as described in Example 9.
Figure 5:
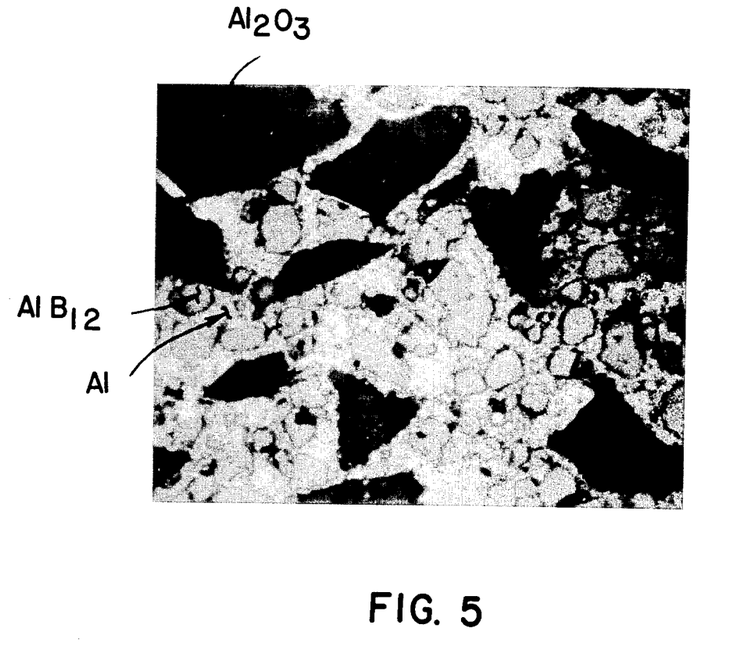
FIG. 5 is a photomicrograph at 400× magnification of a section of an $Al_2O_3/AlB_{12}/Al$ composite formed by reactive infiltration of aluminum into a preform containing 50% by weight $Al_2O_3$ and 50% by weight boron as described in Example 9.

FIG. 4 shows a photomicrograph of a cross section through the composite specimen made with 1% boron in the preform, illustrating the formation of an aluminum matrix composite containing $Al_2O_3$ and a minor amount of $AlB_{12}$ reaction product. For comparison purposes, FIG. 5 shows a composite material prepared by a similar method except that the original preform contained 50% by weight of −325 mesh amorphous boron. The resulting composite contains a much greater amount of $AlB_{12}$ (confirmed by X-ray diffraction) and a smaller amount of alumina and aluminum, as expected from the different preform composition.

EXAMPLE 10

A bar of pure lanthanum, measuring ¾ inch long by ½ inch wide by ¼ inch thick, weighing 10.8 g, wass embedded in 24.5 gg of 98-99% pure crystalline boron powder (−325 mesh size) such that the ¾ inch by ½ inch surface of the lanthanum bar was exposed. The quantity of boron powder surrounding the lanthanum bar was in stoichiometric excess with respect to the formation of lanthanum hexaboride from the reaction of the lanthanum metal bar with the boron powder. The above system was contained in an alumina crucible and heated to approxmmately 1800° C. (as measured on the exposed surface of the lanthanum bar by optical pyrometry) in an induction furnace using direct coupling to the metal. The heating was conducted in an atmosphere of pure argon which flowed at 200 cc/min. Heating to temperature was accomplished over approximately 30 minutes. Reaction was observed on reaching the melting point of the lanthanum metal. Since the optical pyrometric technique measures the temperature on the exposed surface of the metal, the temperature at points in the interior of the metal bar and/or at localized reaction points may be higher than the temperature observed by the optical measurement.

The molten lanthanum metal infiltrated the boron bed radially thereby resulting in a ceramic body containing a void in the position previously occupied by the lantanum bar. The ceramic body wa coherent and porous. X-ray powder diffraction analysis of the material identified the ceramic structure as lanthanum hexaboride.

What is claimed is:

1. A method for producing a self-supporting body comprising: (a) selecting a parent metal, (b) heating said parent metal in a substantially inert atmosphere to a temperature above its melting point to form a body of molten metal, and contacting said body of molten parent metal with a mass comprising a boron source selected from the group consisting of boron and metal boride, (c) maintaining said temperature for a time sufficient to permit infiltration of molten parent metal into said mass and to permit reaction of molten parent metal with said boron source to form a parent metal boride, and (d) continuing said infiltration and reaction for a time sufficient to produce said self-supporting body comprising a metallic phase and parent metal boride.

2. The method according to claim 1 including forming said mass by admixing said boron source with an inert filler, permitting said infiltration and reaction into said formed mass to embed said filler, and producing a composite as said self-supporting body having a matrix embedding said filler, said matrix comprising a metallic phase and parent metal boride.

3. The method according to claim 1 or claim 2 wherein said boron source is present in at least a stoichiometric amount and said infiltration and reaction is continued for a sufficient time to consume substantially all of said parent metal.

4. The method according to claim 3 wherein said infiltration and reaction is continued for a sufficient time to produce a porous body.

5. The method according to any of claims 1 or 2 wherein said parent metal is selected from the group consisting of aluminum, titanium, zirconium, silicon, hafnium, lanthanum, iron, calcium, vanadium, niobium, magnesium and beryllium.

6. The method according to claim 3 wherein said parent metal is selected from the group consisting of aluminum, titanium, zirconium, silicon, hafnium, lanthanum iron, calcium, vanadium, niobium, magnesium and beryllium.

7. The method according to claim 1 wherein said parent metal is aluminum, said boron source is elemental boron, and said self-supporting body comprises aluminum and aluminum boride.

8. The method according to claim 2 wherein said parent metal is aluminum, said boron source is elemental boron, and said matrix comprises aluminum and aluminum boride.

9. The method according to any of claims 1 or 2 wherein said mass is a preform of predetermined shape, and said infiltration and said reaction into said preform produce a self-supporting body having the configuration of said preform.

10. The method according to claim 1 wherein said mass comprises a low density of said boron source, thereby forming a self-supporting body exhibiting properties dominated by the properties of said metallic phase.

11. The method according to claim 2 wherein said mass comprises a low density of of said boron source in the spaces between the constituents of said filler, whereby said resulting matrix exhibits properties dominated by said metallic phase.

12. The method according to any of claims 10 or 11 wherein said boron source is elemental boron.

13. The method according to claim 1 wherein said mass comprises a high density of said boron source thereby forming a self-supporting body exhibiting properties dominated by said parent metal boride.

14. The method according to claim 2 wherein said mass comprises a high density of said boron source in the spaces between the constituents of said filler whereby said resulting matrix exhibits properties dominated by said parent metal boride.

15. The method according to claim 13 or claim 14 wherein said boron source is elemental boron.

16. The method according to claims 2 or 8 wherein said mass comprises at least about 50 weight percent of said boron source; and said parent metal boride is substantially interconnected in at least one dimension.

17. The method according to claims 1, 2, 7, 8, 10, 11, 13 or 14 wherein said mass includes a metal boride reducible by said parent metal, and said metallic phase includes metal from said metal boride.

18. The method according to claim 17 wherein said parent metal is titanium and said reducible metal boride is aluminum dodecaboride.

19. The method according to claim 2 wherein said filler is selected from the group consisting of fibers, whiskers, particulates, powders, rods, wires, wire cloth, refractory cloth, reticulated foam, plates, platelets, solid spheres, and hollow spheres.

20. The method according to claim 19 wherein said parent metal is aluminum and said filler comprises carbon fiber precoated with alumina.

* * * * *

UNITED STATES PATENT AND TRADEMARK OFFICE
CERTIFICATE OF CORRECTION

PATENT NO. : 4,777,014

DATED : October 11, 1988

INVENTOR(S) : Newkirk, et al.

Page 1 of 2

It is certified that error appears in the above-identified patent and that said Letters Patent is hereby corrected as shown below:

On cover sheet change 20 Claims to 27 Claims
In the drawings, sheet 2, Fig. 2, "Aln" should read --AlN--;
Column 2, line 24, "$AlB_{12}$-B.Al." should read --$AlB_{12}$-B/Al--;
Column 6, line 13 "depnnd" should read --depend--;
Column 7, line 41 "parrticles" should read --particles--;
Column 7, line 47 "exposur" should read --exposure--;
Column 9, line 6 "A380.1" should read --A 380.1--;
Column 9, line 51 "paricles" should read --particles--;
Column 12, line 45 "wass" should read --was--;
Column 12, line 46 "24.5gg" should read --24.5g--;
Column 13, line 2 "wa" should read --was--;
Column 13, line 43 "lanthanum iron" should read --lanthanum, iron--;
Column 14, line 14 "density of of" should read --density of--;
Column 14, line 50 insert the following claims:
--21. The method according to any of claims 1, 2, 7, 8, 10, 11, 13 or 14 wherein said inert atmosphere comprises argon.
22. The method according to any of claims 2, 8, 11 or 14 wherein said inert filler comprises a filler having the same composition as said parent metal boride formed in the method.

UNITED STATES PATENT AND TRADEMARK OFFICE
CERTIFICATE OF CORRECTION

PATENT NO. : 4,777,014

DATED : October 11, 1988

INVENTOR(S) : Newkirk, et al.

Page 2 of 2

It is certified that error appears in the above-identified patent and that said Letters Patent is hereby corrected as shown below:

23. The method of claim 5 wherein said parent metal is aluminum.
24. The method of claim 5 wherein said parent metal is titanium.
25. The method of claim 5 wherein said parent metal is zirconium.
26. The method of claim 5 wherein said parent metal is silicon.
27. The method of claim 5 wherein said parent metal is lanthanum. --

Signed and Sealed this

Eighth Day of August, 1989

Attest:

DONALD J. QUIGG

Attesting Officer

Commissioner of Patents and Trademarks